United States Patent
Boeke

(10) Patent No.: US 7,859,867 B2
(45) Date of Patent: Dec. 28, 2010

(54) METHOD AND INVERTER FOR CONVERTING A DC VOLTAGE INTO A 3-PHASE AC OUTPUT

(75) Inventor: Ulrich Boeke, Langerwehe (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 743 days.

(21) Appl. No.: 11/814,682

(22) PCT Filed: Jan. 23, 2006

(86) PCT No.: PCT/IB2006/050244

§ 371 (c)(1),
(2), (4) Date: Jul. 25, 2007

(87) PCT Pub. No.: WO2006/079968

PCT Pub. Date: Aug. 3, 2006

(65) Prior Publication Data

US 2009/0296438 A1 Dec. 3, 2009

(30) Foreign Application Priority Data

Jan. 28, 2005 (EP) .................................. 05100582

(51) Int. Cl.
*H02M 3/335* (2006.01)
*H02M 7/44* (2006.01)

(52) U.S. Cl. ............................ 363/41; 363/40; 363/17; 363/98; 363/132

(58) Field of Classification Search .................. 363/40, 363/41, 17, 98, 132
See application file for complete search history.

(56) References Cited

U.S. PATENT DOCUMENTS

| 5,091,842 | A | * | 2/1992 | Kawai | 363/98 |
| 5,633,793 | A | * | 5/1997 | Lee et al. | 363/127 |
| 5,706,186 | A | * | 1/1998 | Blasko | 363/41 |
| 6,404,658 | B1 | * | 6/2002 | Reilly | 363/125 |
| 6,728,119 | B2 | * | 4/2004 | Reilly et al. | 363/37 |

(Continued)

FOREIGN PATENT DOCUMENTS

DE 3635401 4/1988

(Continued)

OTHER PUBLICATIONS

T. Shimitzu et al.; "A Flyback-type Single Phase", IEEE Power Electronic Specialist Conference, (PESC), pp. 1483-1488, 2002.

*Primary Examiner*—Bao Q Vu

(57) ABSTRACT

A method and inverter (2, 27) for converting a DC input voltage supplied by a DC source (9), which is in particular a solar cell array, into a 3-phase AC output. For each phase (R, S, T) the DC input voltage is converted to a DC output voltage (DCR, DCS, DCT) with a specific waveform. The waveforms of the three DC output voltages are identical, shifted in time by 120° to each other and they are such that by subtracting any two of them a sinusoidal waveform is obtained. The waveform of each DC output voltage may comprise a first portion of ⅓ or 120° of the AC output cycle with an amplitude of zero and a subsequent second portion of ⅔ or 240° of the AC output cycle during which the DC output voltage has a non-zero amplitude.

15 Claims, 6 Drawing Sheets

U.S. PATENT DOCUMENTS

| | | | |
|---|---|---|---|
| 6,924,993 B2 * | 8/2005 | Stancu et al. | 363/41 |
| 2001/0033505 A1 * | 10/2001 | Reilly et al. | 363/125 |
| 2002/0118556 A1 * | 8/2002 | Johnson, Jr. | 363/123 |
| 2003/0026113 A1 * | 2/2003 | Reilly et al. | 363/37 |
| 2004/0004852 A1 * | 1/2004 | Hsu et al. | 363/132 |
| 2005/0281067 A1 * | 12/2005 | Deng et al. | 363/131 |

FOREIGN PATENT DOCUMENTS

| | | |
|---|---|---|
| DE | 19732218 | 3/1999 |
| EP | 1313206 A2 | 5/2003 |
| JP | 1243855 A2 | 9/1989 |
| WO | 9409555 | 4/1994 |

* cited by examiner

METHOD AND INVERTER FOR CONVERTING A DC VOLTAGE INTO A 3-PHASE AC OUTPUT

FIELD OF THE INVENTION

The invention relates to a method and inverter for converting a DC voltage into a 3-phase AC output as described in the preamble of claim 1 and claim 5, respectively. In particular the invention relates to such converting of a DC voltage supplied by an energy source, which supplies a constant power over a cycle time of an AC output frequency. More in particular the invention relates to such converting of a DC voltage supplied by a solar energy cell array.

BACKGROUND OF THE INVENTION

A method and an inverter of said type is disclosed by T. Shimitzu et. al. in a paper at the conference proceedings of the IEEE Power Electronic Specialist Conference (PESC) 2002, p 1483-1488.

If an AC output voltage, which has an output frequency, is supplied to a resistive load an AC current will flow trough the load which has an identical waveform and phase with the AC voltage. Therefore, if the waveform is sinusoidal, the output power will fluctuate with a sinusoidal waveform with twice said output frequency. The DC source is loaded by a fluctuating power though it is able, as a matter of course, to supply a constant power. As a result, if the DC source is of a type, which converts energy from its environment to electrical energy, such as a solar cell array, an important part of the available energy from the environment will not be used and an overall efficiency of a system comprising such energy source will be poor. To solve this it is well known to buffer energy at the input side of the converter to equalize the power by which the source is loaded. However, such solution requires the use of large electrolytic capacitors as buffer. Such capacitors are expensive, have a large volume and have a limited lifetime, which is short with respect to an expected lifetime of a solar cell array, of for example 25 years. To solve this problem said article discloses the use of a DC power smoothing circuit, which is connected to receive the DC input voltage to reduce a ripple of it caused by a fluctuating output power. The smoothing circuit contains a capacitor, which is charged to twice the voltage of the DC input source. As a consequence, said capacitor can be smaller than the commonly used electrolytic capacitors. Apart from the disadvantage of using electrolytic capacitors the problem of the pulsating input/output power difference is not resolved.

The prior art inverter disclosed by said paper comprises a commonly known flyback converter, which is based on a commonly known buck-boost converter. With a flyback converter energy is buffered by a magnetic field in a transformer (with a buck-boost converter in a single inductor instead of said transformer). Energy is supplied from the DC source to a primary winding of the transformer during energy input intervals and taken from a secondary winding of the transformer during energy output intervals, which alternate the energy input intervals. This may be carried out at a high frequency, e.g. 200 kHz. Pulse width modulation (PWM) is used to shape a DC output voltage to conform with halve a cycle of the AC output voltage having a low frequency, e.g. 50 Hz. With the prior art inverter the secondary winding is balanced, such that its outer terminals of it are connected to a corresponding diode in series with a switch and then to a first terminal of a load, and a center tap of the secondary winding being connected to a second terminal of the load. The switches at the output side of the DC converter are controlled to concatenate the DC output voltages with opposite polarities during succeeding halves of the AC output voltage cycle.

A disadvantage of the prior art inverter is that it still requires the use of electrolytic capacitors and that it uses a switched smoothing buffer.

Another disadvantage of the prior art inverter is that it requires a transformer with a balanced secondary winding, two diodes and two switches at its output side. Therefore the inverter is relatively expensive.

Still another disadvantage of the prior art inverter is that it requires to be used in triplicate for providing a 3-phase AC output voltage. Therefore it requires a substantial amount of hardware.

Still, additional hardware would be required to synchronize the three AC output voltages and to phase shift them by 120° with respect to each other. Said paper does not disclose the application of the single phase inverter for a multi-phase arrangement. Consequently it does not disclose the need for synchronization and phase shifting and proper hardware for that either.

OBJECT OF THE INVENTION

It is an object of the invention to solve the drawbacks of the prior art as described above.

SUMMARY OF THE INVENTION

The above object of the invention is achieved by providing a method as described in claim 1. Accordingly, it is not required to temporarily store energy generated by the DC source due to the power flow in each DC/DC converter. It is not required either to apply an individual DC power smoothing circuit and its control for each phase. The method is applicable for providing a 3-phase AC output only. Synchronization of the three phases is an inherent property of the method.

The above object of the invention is also achieved by providing an inverter as described in claim 5. Accordingly, the inverter can be realized by a small amount of hardware, in view of component number and component size. In turn this will reduce costs to manufacture, install and maintain the inverter.

BRIEF DESCRIPTION OF THE DRAWINGS

The invention will become more gradually apparent from the following exemplary description in connection with the accompanying drawing. In the drawing.

DETAILED DESCRIPTION OF EXAMPLES

Figure 1:
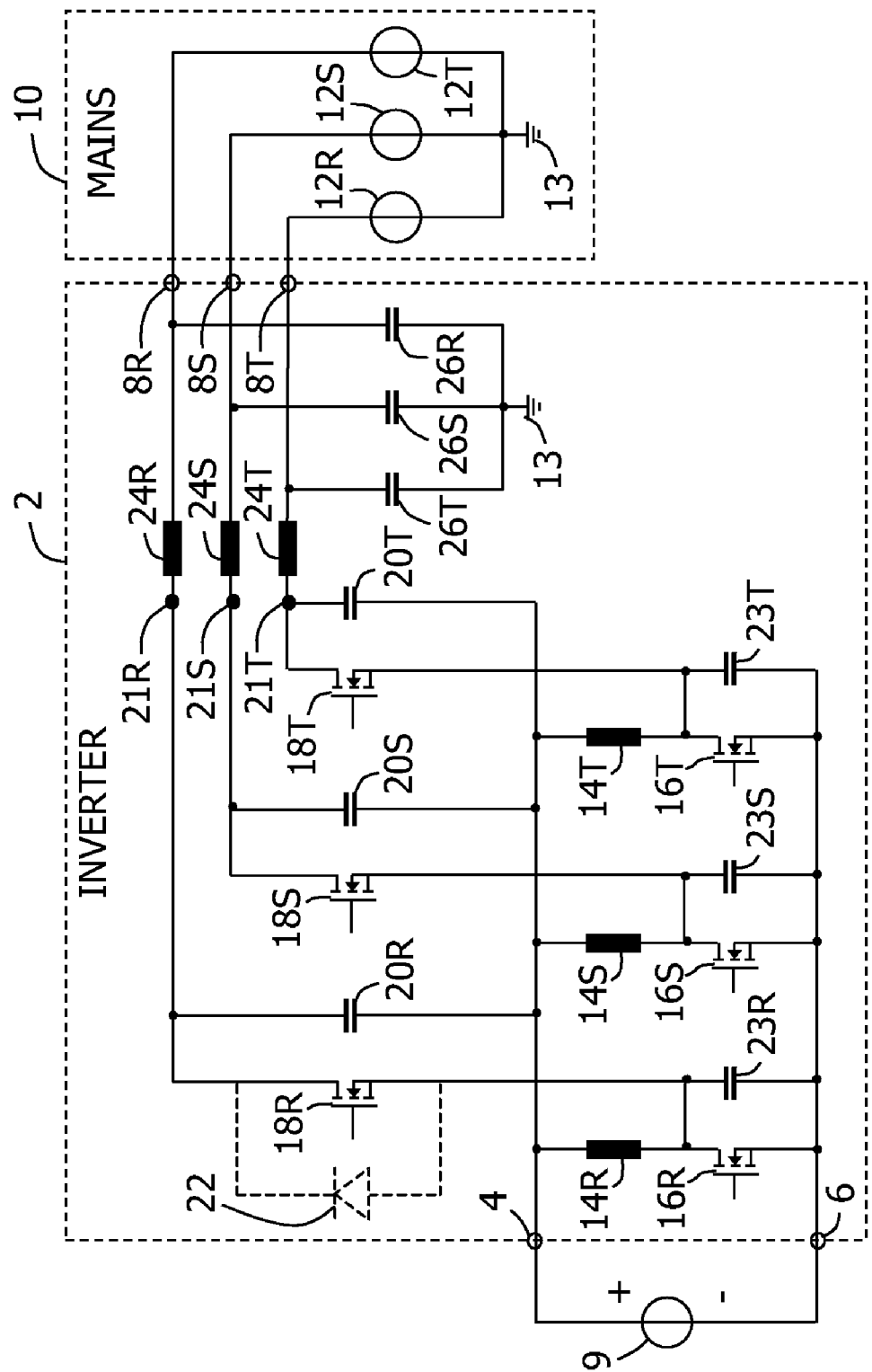
FIG. 1 shows a diagram of a first embodiment of an inverter according to the invention.

In FIG. 1 there is indicated by reference numeral 2 a first embodiment of an inverter according to invention. As explained in further detail below, inverter 2 inverts a DC (direct current) input voltage into a 3-phase AC (alternating current) output voltage system. In this specification the phases will be indicated by the letters R, S and T. Reference numerals having identical meanings but for different phases are completed by a corresponding phase letter. Said letters R, S and T may be omitted hereinafter for simplicity reasons if a statement for the reference numeral applies similarly to all phases. It is assumed, by way of example only, that the inverter is designed to provide the AC output voltage with a 230 Vrms between each phase and a neutral reference, a frequency of 50 Hz and period or cycle time of 20 ms.

The inverter 2 has two input terminals 4 and 6 and three output terminals 8R, 8S and 8T. Input terminals 4 and 6 are shown to be connected to a DC voltage source 9. In particular DC voltage source 9 is a solar cell array, which is capable to provide an input power which is substantially constant during an AC output cycle. The output terminals 8R, 8S and 8T are shown to be connected to a 3-phase mains or grid 10, which comprises for each phase an AC voltage source 12R, 12S and 12T, respectively. A common neutral reference point is indicated by an earth symbol 13.

Inverter 2 comprises for each phase R, S and T a corresponding DC/DC converter. With the first embodiment shown in FIG. 1 each DC/DC converter is of a buck-boost type, which comprises an inductor 14, a first switch 16, a second switch 18 and a capacitor 20. The inductor 14 and the first switch 16 are connected in series to the DC input terminals 4 and 6. The second switch 18 and the capacitor 20 are connected in series. This series connection is connected in parallel to the inductor 14. The switches 16 and 18 may be MOSFETs. A connection node of the second switch 18 (a drain thereof) and the capacitor 20 is connected to a DC output 21 of the DC/DC converter. A circuit as described above for one phase, but having a diode 22 (shown by phantom lines) instead of second switch 18, with the anode of the diode connected to the inductor 14, is known as a buck-boost DC/DC converter. With such a converter the first switch 16 is turned on and off alternately at a high frequency (e.g. 200 kHz) by a control circuit (not shown). During a conducting state of first switch 16 a current flows through inductor 14. During this time energy is stored in the inductor 14 as magnetic field energy. Upon turning first switch 16 off (making it non-conducting) and when using said diode 22 instead of the second switch 18, the current through inductor 14 will continue to flow, but now through a different circuit, which comprises said inductor 14, the capacitor 20, possibly an external load connected to DC output 21 and in parallel to capacitor 20, and said diode 22. Therefore, during the off time of first switch 16 capacitor 20 will be charged by a current from inductor 14. The current through inductor 14 will gradually decrease. Charging capacitor 20 causes an amplitude of a DC output voltage across capacitor 20 to increase. Said amplitude may be controlled by controlling a duty cycle of a control signal by which the first switch 16 is turned on and off. Accordingly, the DC output voltage can be controlled to have a particular waveform as a function of time and with an amplitude which may be lower (bucked) or higher (boosted) than the DC input voltage supplied by DC source 9.

As will be apparent hereinafter, with preferred operation, the output power of a DC/DC converter is negative for two time periods each of 1/12 time period of the AC output voltage. To allow such a bidirectional power-flow in the DC/DC converters bi-directional switch 18 must be used instead of unidirectional diode 22. MOSFET switch 18 has an inherent diode between the source and bulk material of the MOSFET, as anode of the diode, and its drain, as cathode of the diode. For each phase R, S and T switches 16 and 18 are controlled as to not conduct at the same time.

The inverter 2 further comprises a capacitor 23, which is connected in parallel to first switch 16, an inductor 24, which is connected to the DC output 21 and the AC output 8, and a capacitor 26, which is connected to the AC output 8 and a common neutral node, which is indicated by the earth symbol 13. Capacitor 23, together with other components, provides for a high frequency resonant circuit by which switching losses of switch 16 can be reduced. Inductor 24, together with other components is used to shape a waveform of an AC output voltage at the AC output 8. Capacitor 26 filters the AC output voltage. If capacitor 26 is omitted the inverter will still operate properly.

Figure 2:
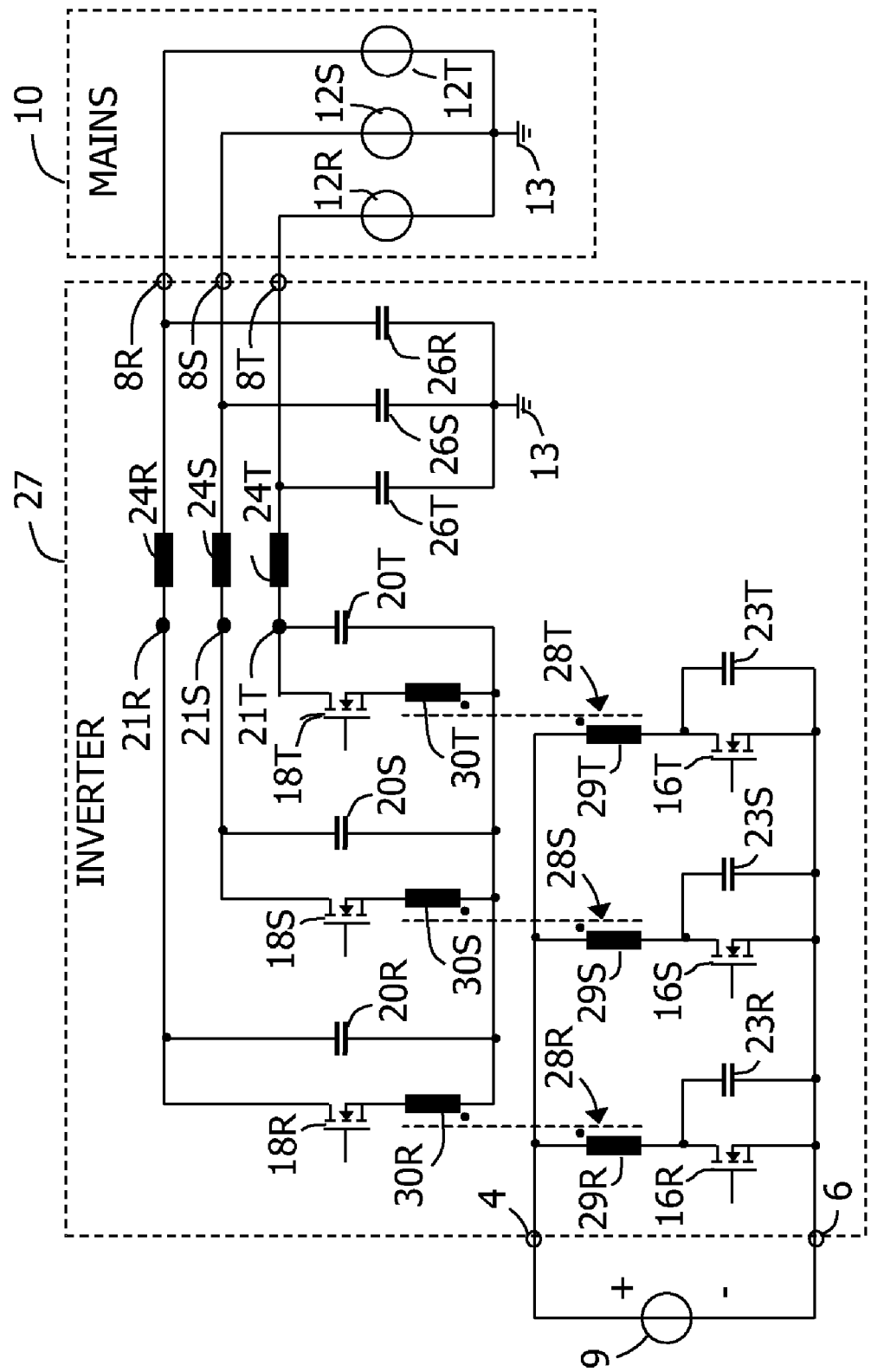
FIG. 2 shows a diagram of a second embodiment of an inverter according to the invention.

FIG. 2 shows a second embodiment 27 of the inverter according to the invention which differs from the first embodiment shown in FIG. 1 by that inductor 14 is replaced by a transformer 28, which comprises a primary winding 29 and a secondary winding 30. The primary winding 29 is connected the way inductor 14 of FIG. 1 is. The secondary winding 30 is connected to the second switch 18 and to the capacitor 20 such, that capacitor 20 is connected in parallel to a series circuit of the second switch 18 and the secondary winding 30 and not to DC input terminal 4. Therefore, a primary part comprising said primary winding 29 has no electrical connection to a secondary part comprising the secondary winding 30. This provides for a safe electrical separation of the DC input source 9 from the mains 10.

Figure 3:
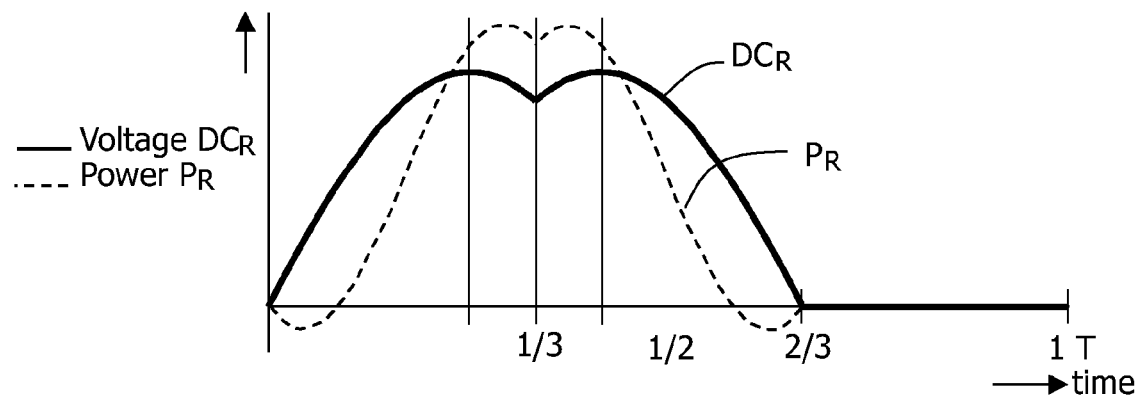
FIGS. 3 to 5 each show a time diagram of one out of three DC output voltages and of a corresponding output power.
Figure 4:
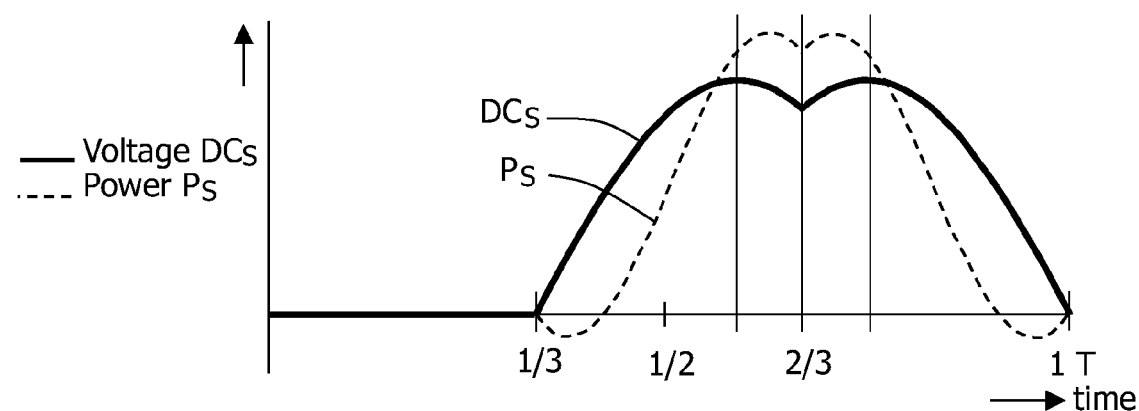
Figure 5:
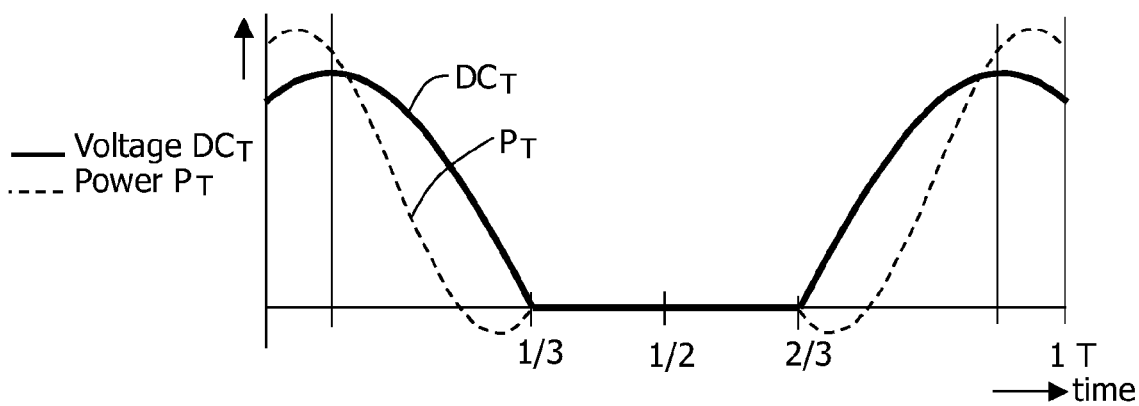
Figure 6:
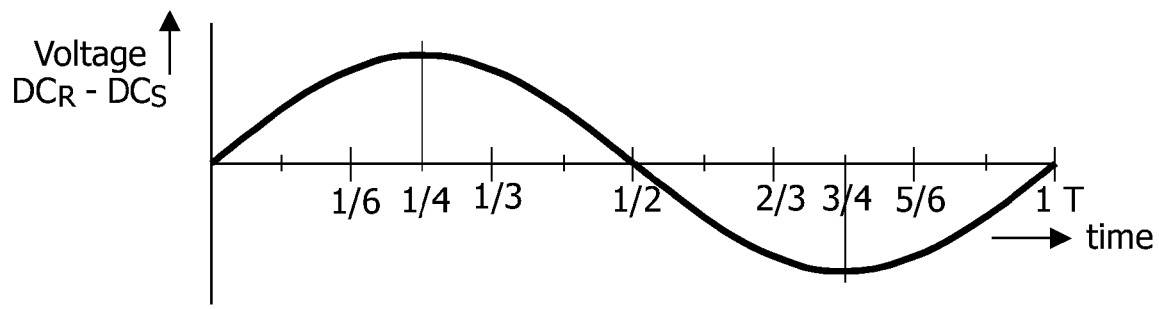
FIGS. 6 to 8 each show a time diagram of one out of three differential voltage between three pairs of DC output voltages.
Figure 7:
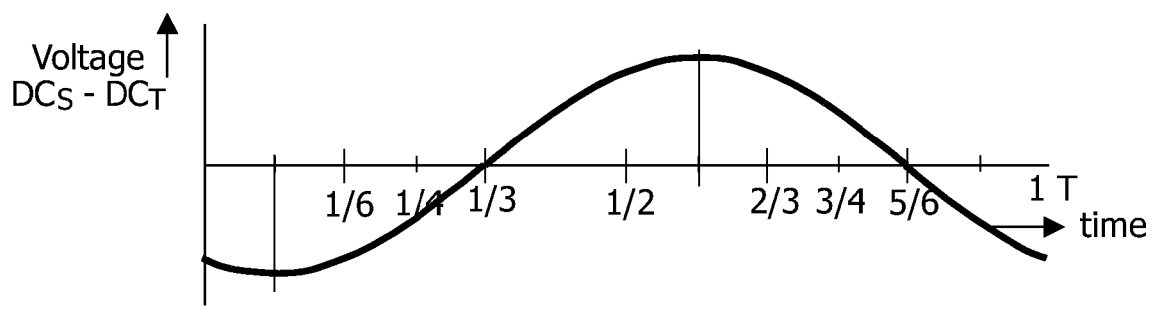
Figure 8:
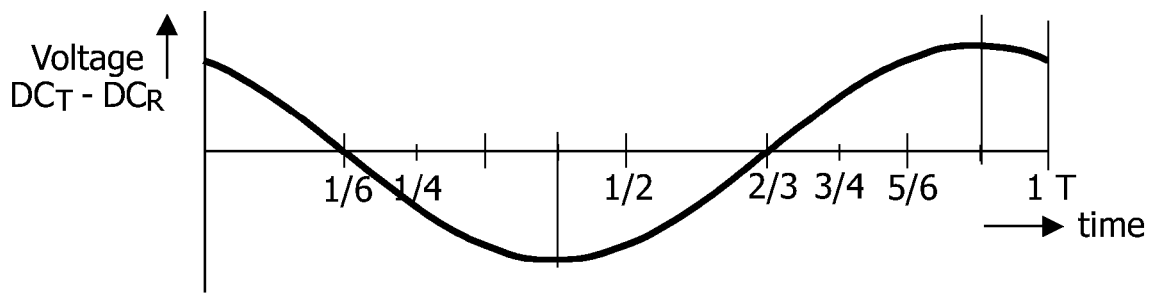
Figure 9:
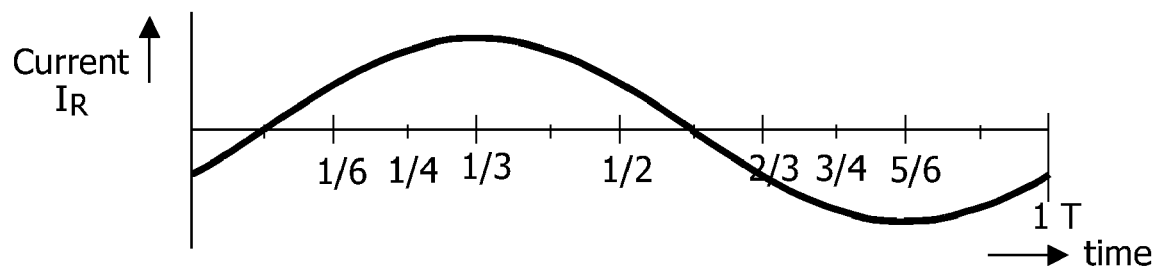
FIGS. 9 to 11 each show a time diagram of one out of three AC output currents.
Figure 10:
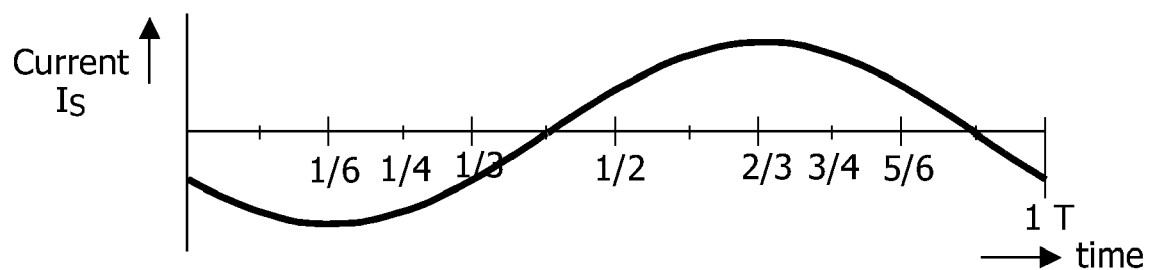
Figure 11:
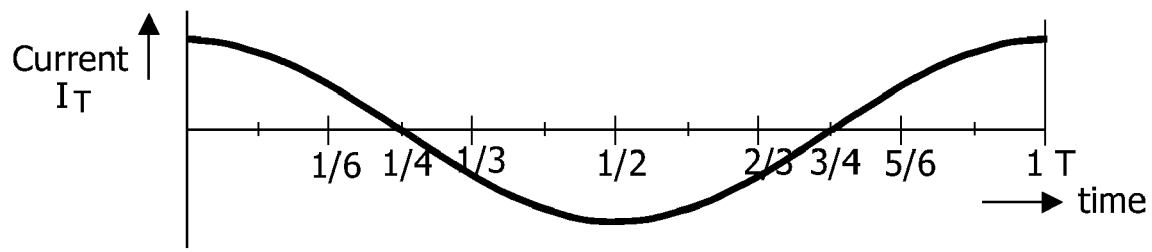

The switches 16 and 18 of inverters 2 and 27 are PWM controlled to generate DC output voltages $DC_R$, $DC_S$ and $DC_T$ at DC outputs 21R, 21S and 21T, respectively, across capacitors 20R, 20S and 20T, respectively, and with waveforms as shown by solid lines in FIGS. 3, 4 and 5 respectively. Each of said waveforms has an identical shape, comprising a first portion with a duration of 1/3 or 120° of the AC output cycle with amplitude zero and a second portion, which alternates the first portion, with a remaining duration of 2/3 or 240° of the AC output cycle with a non-zero amplitude. The shape of the second portion of the waveform conforms a concatenation of an initial section covering 120° of a sinusoidal shape followed by a section covering 60°-180° of the sinusoidal shape. The three waveforms for the corresponding three phases R, S and T are phase shifted with respect to each other by 120°. When subtracting two DC output voltages having waveforms as shown in FIGS. 3, 4 and 5 from each other sinusoidal waveforms will result, as shown in FIGS. 6, 7 and 8. If the AC outputs 8R, 8S and 8T are connected to external equipment, in particular the mains 10, an AC current will flow through the corresponding inductors 24R, 24S and 24T which will have the same effect for an AC output waveform as said subtracting DC output voltages from each other. Accordingly, the three currents $I_R$, $I_S$ and $I_T$ will have a sinusoidal shape and they will be phase sifted with respect to each other by 120°, as shown in FIGS. 9, 10 and 11. If the output of the inverter 2, 27 is connected to a resistive load, the AC output voltages at the AC outputs 8R, 8S and 8T will have identical shapes and phases as the corresponding AC currents $I_R$, $I_S$ and $I_T$ respectively.

Figure 12:
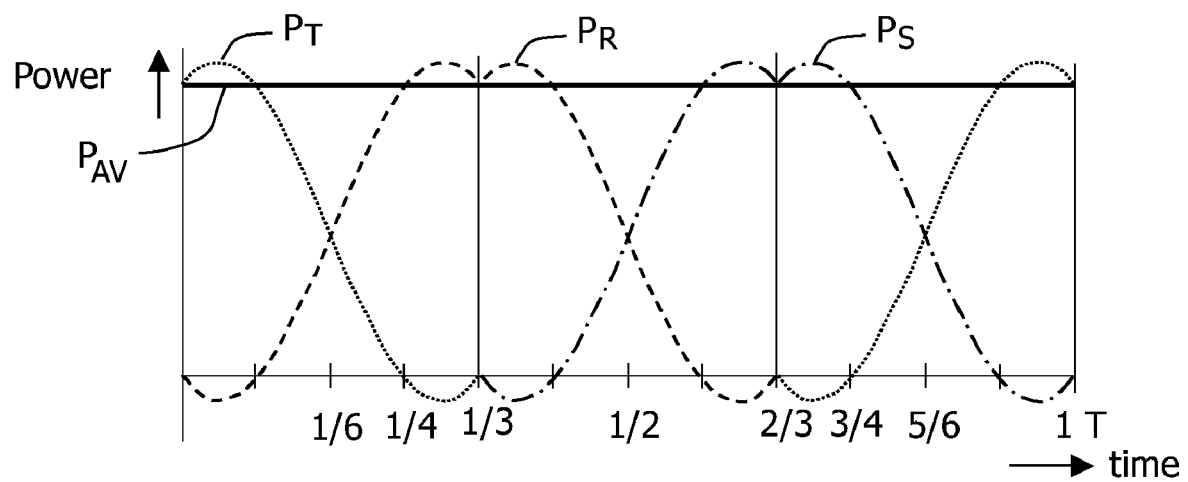
FIG. 12 shows a time diagram of output power curves shown in FIGS. 3 to 5 and their sum.

The output power of the inverter 2, 27 for each phase equals the DC output voltage multiplied by the current through the inductor 24 corresponding to that phase. The resulting waveforms for output powers $P_R$, $P_S$ and $P_T$ are indicated by dash-lines in FIGS. 3, 4 and 5, respectively. When summing said waveforms for output powers $P_R$, $P_S$ and $P_T$ a flat line, which represents an average output power $P_{AV}$ of the inverter 2, 27 as indicated in FIG. 12. As a consequence, the DC voltage source 9 is virtually connected to a load with a constant output power, which is practically identical to the input power which the voltage source 9 can supply. Therefore the inverter 2, 27 according to the invention is very energy efficient in cases where the DC source 9 is a generator, such as a solar cell array, without the need for bulky electrolytic capacitor for storing energy from the DC source during a significant part of a pulsating output power. Because of the absence of said electrolytic capacitors the inverter 2, 27 according to the invention the costs for manufacturing will be reduced, its size may be reduced and a its lifetime may be increased without the need for maintenance for replacing electrolytic capacitors.

During said first portions of the DC output waveform, during which its amplitude is zero, the first switch is made non-conducting. During this time the second switch 18 is made and maintained conducting. As a result no switching losses will occur during this time, which will increase the efficiency of the inverter 2, 27.

It is noted that within the scope of the invention, as determined by the claims, several modifications can be made. For example, the DC output waveforms shown in FIGS. 3, 4 and 5 are presently preferred examples only. Dependent on a shape of the AC output waveform (pure sinusoidal or not) one may use other DC output waveforms. For obtaining a constant output power $P_{AV}$ it is just required that the differential voltages ($DC_R$-$DC_S$; $DC_S$-$DC_T$; $DC_T$-$DC_R$) are sinusoidal. Further, the buck-boost type DC/DC converter and flyback type DC/DC converter are examples also and could be replaced by a DC/DC converter of a different type.

The invention claimed is:

1. A method for converting a DC (direct current) input voltage from a DC source (9) into an AC (alternating current) output voltage having an AC output waveform, an AC output frequency and an AC output cycle, comprising converting the DC input voltage to a DC output voltage with a specific DC output waveform, and combining with opposite polarities similar, but time shifted, DC output voltage waveforms, such as to provide the AC output voltage with respect to a reference voltage, characterized in that, the DC input voltage is converted into three DC output voltages ($DC_R$, $DC_S$, $DC_T$), one for each phase (R, S, T), having identical, but time shifted waveforms, each DC output voltage is supplied to a corresponding inductance (24) to provide the AC output voltage, and the waveforms being such, that when subtracting any two of said DC output voltages from each other a sinusoidal waveform with the AC output frequency is obtained.

2. Method according to claim 1, characterized in that, each DC output voltage ($DC_R$, $DC_S$, $DC_T$) is zero during a first portion of 120° of the AC output cycle and during a remaining second portion of 240° of the AC output cycle the waveform of each DC output voltage conforms a concatenation of a first section covering 0°-120° of a sinusoidal waveform with the AC output frequency and a second section covering 60°-180° of such sinusoidal waveform.

3. Method according to claim 1, characterized in that, each DC/DC converting of the DC input voltage is carried out by a corresponding buck-boost converter.

4. Method according to claim 1, characterized in that, each DC/DC converting of the DC input voltage is carried out by a corresponding flyback converter.

5. A method comprising:
generating, from a DC input voltage, three intermediate voltage waveforms, each of the three intermediate voltage waveforms being substantially identical to each other but each being shifted in time with respect to each other; and
supplying the intermediate voltage waveforms to three corresponding inductances to provide three AC output voltage waveforms each having a same AC output frequency and being shifted in phase with respect to reach other,
wherein the three intermediate voltage waveforms each have a waveform shape such that when any one of the intermediate voltage waveforms is subtracted from any other of the intermediate voltage waveforms, a sinusoidal waveform with the AC output frequency is obtained.

6. The method of claim 5, wherein each of the three intermediate voltage waveforms is zero during ⅓ of each cycle of the AC output frequency, and during a remaining ⅔ of the AC output cycle, the intermediate voltage waveform is a concatenation of a first section having a waveform shape of 0°-120° of a sinusoidal waveform having the AC output frequency, and a second section having a waveform shape of 60°-180° of the sinusoidal waveform.

7. The method of claim 5, further comprising generating each of the three intermediate voltage waveforms with a corresponding buck-boost converter.

8. The method of claim 5, further comprising generating each of the three intermediate voltage waveforms with a corresponding flyback converter.

9. A device, comprising:
a pair of DC voltage terminals configured to receive a DC voltage;
three converters configured to convert the DC voltage into three corresponding intermediate voltage waveforms;
three AC output terminals adapted to provide three AC output voltage waveforms each having a same AC output frequency and being shifted in phase with respect to reach other;
three inductors, each inductor coupling one of the intermediate voltage waveforms to one of the three AC output terminals; and
a controller configured to control the three converters such that each of the three intermediate voltage waveforms are substantially identical to each other but are each shifted in time with respect to each other, and that each of the three intermediate voltage waveforms has a shape such that when any one of the intermediate voltage waveforms is subtracted from any other of the intermediate voltage waveforms, a sinusoidal waveform with the AC output frequency is obtained.

10. The device of claim 9, wherein each converter is controlled such that its corresponding intermediate voltage waveform is zero during ⅓ of each cycle of the AC output frequency, and during a remaining ⅔ of the AC output cycle, the intermediate voltage waveform is a concatenation of a first section having a waveform shape of 0°-120° of a sinusoidal waveform having the AC output frequency, and a second section having a waveform shape of 60°-180° of the sinusoidal waveform.

11. The device of claim 9, wherein each converter comprises a switch, which is connected to an output node of the converter, and the controller controls the switch to conduct during said ⅓ of each cycle of the AC output frequency of its intermediate output waveform.

12. The device of claim 9, wherein each converter comprises a buck-boost converter.

13. The device of claim 9, wherein each converter comprises a flyback converter.

14. The device of claim 9, wherein each converter comprises a switch connected in series with a second inductance across the DC voltage terminals, and a capacitor connected in parallel with the switch.

15. The device of claim 9, further comprising a solar energy cell array connected to the pair of DC voltage terminals.

* * * * *